Dec. 2, 1958    F. J. ZUIDERWEG ET AL    2,862,696
APPARATUS FOR CONTACTING LIQUIDS AND GASES
Filed Feb. 4, 1955    3 Sheets-Sheet 1

INVENTORS
FREDERIK JOHANNES ZUIDERWEG
HENDRIK VERBURG
BY *Oswald H. Milmore*
THEIR ATTORNEY INVENTORS:
FREDERIK JOHANNES ZUIDERWEG
HENDRIK VERBURG
BY: *Oswald H. Milmore*
THEIR ATTORNEY Dec. 2, 1958   F. J. ZUIDERWEG ET AL   2,862,696
APPARATUS FOR CONTACTING LIQUIDS AND GASES
Filed Feb. 4, 1955   3 Sheets-Sheet 3

INVENTORS
FREDERIK JOHANNES ZUIDERWEG
HENDRIK VERBURG
BY *Oswald H. Milmore*
THEIR ATTORNEY

United States Patent Office 2,862,696
Patented Dec. 2, 1958

2,862,696

APPARATUS FOR CONTACTING LIQUIDS AND GASES

Frederik Johannes Zuiderweg and Hendrik Verburg, Amsterdam, Netherlands, assignors to Shell Development Company, New York, N. Y., a corporation of Delaware Application February 4, 1955, Serial No. 486,212

Claims priority, application Netherlands February 12, 1954

10 Claims. (Cl. 261—113)

This invention relates to improvements in the art of effecting intimate contact between a liquid and a gas ("gas" being used herein to include vapor) in contact tray columns, i. e., in columns provided with vertically spaced horizontal trays having gas passages distributed over the tray area, e. g., in the form of grid trays (formed of parallel bars that may be straight or curved and are spaced to leave slots), slit plates (plates that are punched or otherwise fabricated to provide slits) sieve plates (plates having a multitude of holes) or bubble cap trays. The invention is particularly concerned with the manner of and arrangements for passing liquid from a tray to a lower tray.

The known bubble cap trays have relatively large discharge openings and downcomers for the passage of liquid to a lower tray, which downcomers provide confined channels that have liquid seals to prevent the upflow of gas, e. g., by immersion in liquid on the next lower tray or by a bulky liquid-seal device or gas trap. Additionally, imperforate areas that serve as liquid-receiving zones are usually provided on such trays in the vicinities of the downcomers from the higher trays. The gases which rise from the bubble caps, as well as these caps themselves, offer a high resistance to the horizontal flow of liquid across the tray from the liquid-receiving zone toward the discharge opening. Three considerable drawbacks of such trays are the liquid gradient created by the said resistance; the loss of active tray area wherein gas-liquid contact is effected on account of the liquid discharge openings and the liquid-receiving zone; and the reduction of the volume of the inter-tray free space by the presence of the liquid-handling conduits. These drawbacks adversely affect the capacity of the tray, and the first and third of these drawbacks manifest themselves particularly the more the loading of the tray is increased by increased gas and liquid throughput.

In addition to such bubble cap trays, there are known types of trays, such as grid trays, trays with slit plates, and sieve plates, in which these drawbacks may be avoided. These types of trays include embodiments in which the passage of both the ascending gases and the descending liquid occurs only through slots, slits or openings that are uniformly distributed over the tray area, i. e., in which no larger openings are present for passage of the liquid to a tray situated at a lower level. In such known trays (see, for example, British patent specification No. 618,029) each tray opening serves, either alternately or simultaneously, for the passage of liquid as well as gas.

Although the drawbacks previously mentioned in connection with bubble cap trays are entirely overcome by the types of trays just described, other drawbacks appear which are associated with irregular liquid surges or wave motions across a tray which occur when the load of such a column is increased. Owing to these surges or motions there is more liquid, now on one part of the tray and now on another, than on the rest of the tray. Where there is more liquid it exerts a greater hydrostatic head and obstructs gas flow, while the liquid itself tends to flow down through the openings without having been effectively contacted with gas, whereas where less liquid is present gas rises through the openings and engages an insufficient amount of liquid accumulated on the tray for a proper exchange with the liquid. In other words the gas-liquid flow ratio is not uniform over the tray area and poor contacting is then attained. Moreover, such maldistribution on a particular tray tends to cause non-uniform distribution also on the higher and the lower trays, since the local downflow of liquid from a particular tray results in liquid build-up at the corresponding place on the next lower tray with an increased downflow rate, and the increased local upflow of gas has a similar effect on the next higher tray.

It has, further, been found that considerable adverse effects on capacity and contacting efficiency are encountered when scaling up trays, particularly those of the types mentioned in the two preceding paragraphs. Efficiency, particularly, appears to decrease materially with increase in tray diameter, the probable cause being an aggravation of the non-uniform gas-liquid flow ratio prevailing over the tray area, with resultant poorer mixing.

It is the general object of the invention to overcome the said drawbacks adhering to the various types of trays and thus to increase the loading range, efficiency and tray capacity.

A further object is to promote a more uniform distribution of the gas flow through trays of the type wherein all liquid transfer between trays is by fall through the inter-tray space, i. e., trays that do not have liquid downcomers extending from tray to tray, and to maintain such improved distribution particularly at the higher tray loadings, and to extend the loading at which such trays can be operated without exceeding the flood point, by collecting a part of the liquid spray in one or more restricted zones on each tray and flowing the collected liquid to the inter-tray space beneath the respective trays while maintaining in said zones at about the level of the associated trays bodies of the collected liquid in such a way as to induce such downflow of liquid and prevent the upflow of gas through said zones, whereby the need for liquid seals is obviated.

Still another object is to provide a device for holding a becalmed portion of the liquid accumulated on the tray for discharge to a lower tray by free fall through the inter-tray space, which device is readily installed on new or existing trays and will increase both the capacity and efficiency of the trays, particularly larger diameter trays and especially trays of the types that permit liquid downflow through the distributed gas passages, e. g., grid, slit plate and sieve plate trays and trays with bubble caps that do not have gas risers. Ancillary thereto, it is an object to provide a liquid-holding device of the type indicated in combination with a spray-catching structure for engaging the spray formed by the gas and feeding spray liquid into the device.

In summary, in the gas-liquid contacting method according to the invention, a low-density gas-liquid mixture is maintained on the major, horizontally open part of the tray by upwardly flowing gas currents distributed over the tray area, one or more relatively calm zones of small areas are preserved on the tray adjoining said open part and a substantially homogeneous liquid layer of greater density is maintained continuously in each said zone at about the tray level by collecting therein a portion of the spray that is greater in relation to the zone area than that falling on other parts of the tray and discharging liquid from said layer into the space beneath the tray at a level near said tray, i. e., not lower than one-third of the distance down to the next lower tray. Continuous maintenance of the said liquid layer inherently implies that the discharge is restricted and that the liquid layer prevents gas from ascending through the restricted zone to render the liquid non-homogeneous. The trays can thereby be constructed without liquid downcomers, liquid seals, or similar liquid-handling appliances that protrude for significant distances beneath the trays, and the trays are advantageously so constructed even when, in accordance with prior art practice, such liquid-handling appliances should be present, e. g., with bubble caps. Aside from their complexity, such appliances reduce the free inter-tray space wherein the liquid spray is disengaged from the ascending gas, and it is a special feature of the invention that the principal zone of gas-liquid disengagement is not restricted by such appliances.

The said homogeneous liquid layer has a higher specific gravity than the surrounding, more or less foamy, heterogeneous gas-liquid mixture occurring over most of the tray area; the result is that the homogeneous liquid exerts a greater hydrostatic head and passes downwards more readily in opposition to the gas pressure beneath the tray than the said surrounding mixture. In the case of trays with bubble caps having risers, liquid flows down exclusively from such restricted zone or zones, and in the case of the other trays referred to, including those with riserless bubble caps, at least a part or all of the liquid flows down from this zone or zones and preferably the tray is operated at a sufficiently high loading that substantially only gas passes through the openings that are distributed over the remaining area of the tray. By the application of this invention large-diameter trays can be subdivided, as far as their operation is concerned, into a number of smaller tray regions by providing and maintaining thereon several of the said restricted zones without physically partitioning the trays. It will be appreciated that, in general, for best results the liquid must not be allowed to fall directly from a restricted zone into a corresponding restricted zone on a lower tray, as in such case it would join the homogeneous liquid in the latter and flow directly with the latter liquid to a still lower tray without being brought into effective contact with gas.

To insure the formation and maintenance on each tray of a restricted calming zone containing the requisite layer of homogeneous liquid, the tray is, in accordance with the invention, provided with a calming device having a wall extending upwards a short distance above the tray level and closed peripherally, so as to enclose the said restricted, basin-like zone, which zone is open to the top for the entry of liquid. The said zone occupies an area that is a minor part of the total tray area; usually, the total area of the one or more calming devices is about 5–20% of the tray area, but larger calming zone areas may be used in the case of contacting columns operated at high liquid loadings. These zones have liquid outlets at the bottoms of sizes adequate to pass off the liquid but offering sufficient resistance to maintain the necessary body of homogeneous liquid and prevent upflow of gas. Thus, the calming devices may have a bottom or floor that is a part of the calming device or be simply a part of the tray itself, and one or more openings, e. g., slits or holes, are provided in the bottom. When the outlets are simple openings in the bottom, which constitutes the preferred arrangement, their aggregate area is less than the area of the enclosed restricted zone, but the invention can also be practiced with elongated discharge devices that offer some flow resistance. The openings may be of the same shape and size as those on the remaining part of the tray, as when the bottom is formed by the tray itself. When a separate bottom is provided it may be displaced a short vertical distance from the tray level, preferably beneath it by a distance not to exceed one-third of the inter-tray space, to increase the depth of the liquid layer.

In order to obtain the desired effect it is necessary that the basin within the enclosing walls remain filled with a sufficient quantity of liquid to prevent gas from blowing out the liquid. To facilitate filling the basin a spray-catching device, e. g., a vertical or inclined baffle, which may be imperforate or perforated, is provided above the basin, by which a portion of the spray is engaged and coalesced, and along which it runs down into the basin. This baffle may be formed by increasing one portion of the enclosing wall above the height of the other parts thereof, or may be a partition rising from an intermediate part of the basin so that both sides of the baffle can operate to catch liquid. The baffle preferably extends the full length of the longer dimension of the basin when the latter is elongated.

Freedom of choice, is, of course, given as regards the shape of the basin enclosed by the wall, which can be adapted to circumstances. It was found advantageous to use zone widths between one-half and four inches. Narrower zones collect disproportionately smaller amounts of liquid spray, possibly due to rebound of the spray from the catching baffles; on the other hand, wider zones do not produce sufficient damping of the surges that wash the heterogeneous gas-liquid mixture from other parts of the tray over the weir formed by the top of the wall, resulting in a varying hydrostatic head within the calming zone that may permit gas to ascend through the said zone. The length of the zone is advantageously at least twice the width, and the longitudinal axis of the zone may be straight, curved, cruciform, or shaped as desired.

When operating at the preferred high loading the restricted zones receive a quantity of liquid that is higher in relation to the zone areas than other parts of the tray. This preferential liquid-collecting action does not occur, however, at small loads when the heterogeneous liquid-gas bed is not high enough to splash into the zone. Trays of the grid, slit plate and sieve plate types operate in the low loading range as if the calming device were not present. The choice of the height of the enclosing wall above the tray level determines the load at which the tray begins to operate in the manner described above, with preferential liquid downflow through the calming zone and preferential gas upflow through the remainder of the tray openings. For any given height of the enclosing wall the liquid and gas bed or spray which forms on the tray will, at a certain load, reach a height at which the enclosed basin receives enough liquid to come into operation; this is herein called the fill point. The lower the height of the wall is chosen, the sooner will this fill point be reached. However, the height must not be so low that the collected liquid is inadequately becalmed and has an insufficient depth to oppose the upflow of gas.

To permit the use of moderately low wall heights and yet prevent the calming zones from being blown empty at high gas flow rates it is desirable to provide trays that give a low pressure drop to the upflow of gas over the regions of the tray outside of the calming zone. The invention is, therefore, particularly applicable to grid, slit plate and sieve plate trays; when applied to bubble cap trays it is advantageous to employ bubble caps with streamlined passages, particularly those without vapor risers. Other expedients for reducing the tendency toward blowing empty are described hereinafter.

The special advantage of applying the invention to bubble cap trays is that, owing to the absence of downcomer pipes, the active surface of the trays is increased, since where otherwise downcomers issue above the tray, bubble caps can now be placed. Moreover, the liquid flowing from a calming zone to a lower tray will arrive there at a place where there are bubble caps through which the gases or vapors pass, and even during its fall the liquid stream will be met by the gas stream. As a result the liquid is distributed over the tray, which may have a favorable effect on the liquid gradient on the tray.

The invention will be further illustrated with reference to the accompanying drawings forming a part of this specification and showing certain preferred embodiments thereof, wherein.

Figure 1:
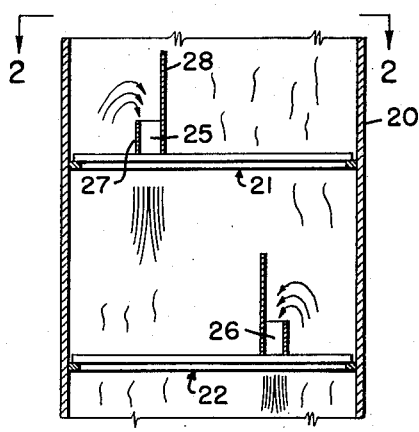
Figure 1 is a vertical sectional view of a part of a grid tray contacting column constructed in accordance with the invention.

Although in the drawings certain specific calming devices are shown in association with specific types of trays and arranged in certain specific patterns on the tray, it should be understood that these associations and patterns are merely illustrative and that the various features may be applied individually to the several other embodiments. Like numbers denote like or corresponding parts on the several views.

Figure 2:
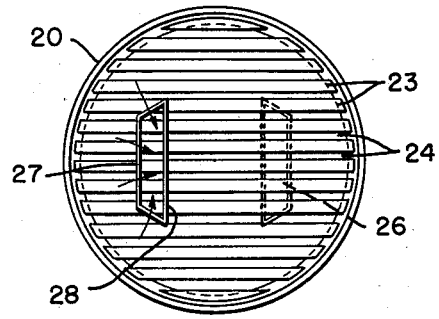
Figure 2 is a transverse sectional view, taken on the line 2—2 of Figure 1.

Referring to Figures 1 and 2, 20 indicates an intermediate section of a vertical column which is provided at the top and bottom with inlets and outlets (not shown) and, if desired, with a liquid distributor, a condenser and a reboiler (also not shown) as are well understood in the art, for causing gas to ascend and liquid to descend. The column contains a plurality of horizontal, vertically spaced contacting trays 21 and 22 extending over the full cross section of the column and formed from a plurality of parallel bars 23 of any suitable cross sectional shape, e. g., rectangular, preferably of equal widths and spaced apart to provide intervening slots 24 that have like widths over the tray area. The bars may, for example, be from 0.5 to 2.5 inches in width and the slots from 0.05 to 1.0 inch in width, the relation being such as to provide an aggregate slot area that is about 7–50% of the tray area. Slot widths between 0.1 and 0.6 inch and aggregate slot areas from 10% to 25% are most common in such trays. Each tray is provided with a calming device in the form of a catch basin 25 or 26 defining restricted calming zones. These basins are arranged on successive trays in staggered positions, i. e., in such a way that liquid flowing down from the basin 25 through the portions of the slots 24 beneath it does not fall directly into the basin 26; although such liquid would be in contact with gas between trays 21 and 22 while falling, this would not result in intimate, effective contacting and once the liquid enters the lower basin it would flow downward to the tray below tray 22 without further contact with gas. The basins include a peripherally closed wall 27, shown trapezoidal in outline, extending above the tray level to a height which determines the load required for the calming zone to begin to operate, and an upwardly extending spray-catching baffle 28, which is conveniently formed by extending one traverse of the peripheral wall (preferably the longest one) to a height above the others, to engage a part of the liquid spray that is splashed up by the gas from tray regions outside of the basin. Such spray, after impinging against the spray-catching baffle 28, is partly coalesced and flows down along the baffle and enters the basin, together with additional spray falling directly into the basin and deflected by the baffle. The bottom of the basin is formed by a part of the grid tray itself.

In operation, liquid falling onto each tray is prevented from draining freely through the slots 24 by the upward flow of the gas, and the liquid thus accumulated is engaged by the gas, broken up, and thrown up to form an intense spray or foam, depending upon the characteristics of the gas and liquid. (The term "spray" is used herein to denote generically any such liquid and gas bed formed by the gas and including liquid that is disrupted to expose a large liquid surface.) The liquid spray is disengaged from the gas in the free space above the tray and falls again onto the tray. At low loading the liquid descends through the slots 24 throughout the tray area, flowing usually in alternation to the gas at any one limited region; under these conditions the depth of the gas-liquid bed is low and the amount of liquid collected in the basins is not greater or materially greater in relation to the area thereof than elsewhere; the part of the tray area occupied by the catch basins behaves substantially in the same manner as the remaining part of the tray.

When the loading, i. e., liquid and/or the gas flow rate, is increased, the depth of the gas-liquid bed increases and eventually liquid can no longer flow downward through the slots at the required rate and flooding occurs. This point is accompanied by a sharp increase in the tray pressure drop. Now it was found that by operating in accordance with the invention this flood point and sharp increase in the pressure drop occurs at significantly higher loadings. In the trays provided with the calming devices, as the loading is increased to exceed the filling point, liquid enters the catch basins at a disproportionately increasing rate, at first by direct fall and surge over the top of the enclosing wall 27, and at still higher loadings additionally by the action of the catching baffle 28. This collection of liquid in the catch basin at a rate that is higher than average in relation to the area of the basin at first impedes the upflow of gas through the basin and later stops such flow. The narrow width of the basin, in a direction normal to the baffle 28, also helps to quiet the liquid within it, while the enclosing wall shields it from the surges and waves of the surrounding gas-liquid bed. The collected liquid is, therefore, becalmed and becomes more or less homogeneous, thereby attaining a density greater than that of the surrounding gas-liquid bed and establishing a hydrostatic head sufficient to flow out continuously through the slots. This uninterrupted efflux of liquid prevents the gas-liquid bed on other regions of the tray from building up to an excessive height and, consequently, prevents the pressure drop through the tray from increasing until the tray loading is considerably above that at which flooding would otherwise be encountered.

Since contacting efficiency increases with loading, it is preferred to operate the column above the fill point, at loadings so high that most or, preferably, all of the liquid flows down through the catching basins and substantially only gas ascends through the slots outside of the basins. The height of the wall 27 above the basin floor must be sufficient to retain within the basin a head of liquid that exceeds the head corresponding to the greatest pressure drop through the tray, measured between the bottom of the basin and the top of the wall 27, by the liquid head required to flow the liquid through the openings at the bottom of the basin; also, it must extend above the tray level to insure calming. The wall should not, however, be so high as to limit the entry of liquid and become filled only at excessively high loadings. Without restricting the scope of the invention, it may be stated that heights of from about one-tenth to one-fourth of the inter-tray spacing can be used. There is no limit to the height of the catching baffle 28 except the tray spacing.

Figure 3:
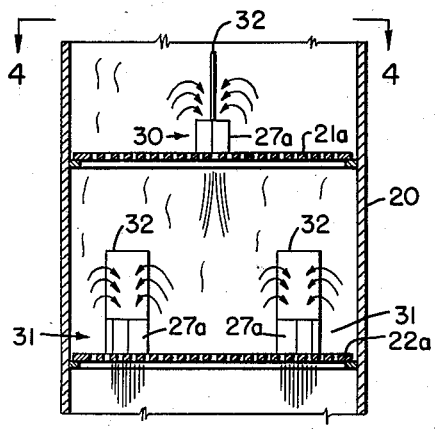
Figure 3 is a vertical sectional view of a part of a sieve plate column to which a modified embodiment of the calming device is applied.
Figure 4:
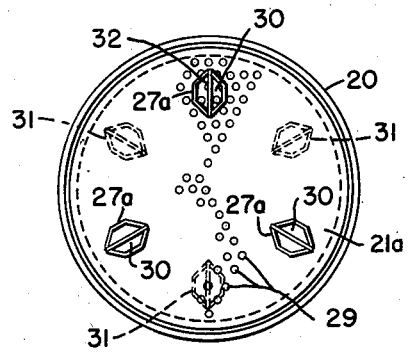
Figure 4 is a transverse sectional view, taken on the line 4—4 of Figure 3.

As was indicated above, it is possible to employ a plurality of catch basins on each tray and to use both faces of a spray-catching baffle to feed a calming zone. Both variants are illustrated in the embodiment of Figures 3 and 4, wherein the trays 21a, 22a which again extend over the full column cross section, are sieve plates, i. e., metal or plastic plates having a multitude of small holes 29, of any desired outlines, e. g., circular holes with diameters from 0.2 to 1.0 inch, in sufficient number to provide an aggregate free passage of about 7–50% and, more usually, 10–25%, of the total tray area. Each tray has three basins 30 or 31, hexagonal in shape and situated at rays from the center diverging at angles of 120°, the basins on each tray being staggered by an angle of 60° from those on adjoining trays. Each basin has a peripheral wall 27a which is hexagonal in outline and which should, for the same size of tray, enclose an area that is smaller than the area of the single basin in the case of Figures 1 and 2. The portion of the tray under the basin constitutes the bottom. The height of the wall 27a is uniform about the perimeter and each basin is provided with a vertical partition 32 which extends between the most remote apices of the wall 27a and serves as a spray-catching baffle. Both sides of the baffle can now serve to feed liquid into the basin. The bottom of the baffle may be spaced above the tray or be perforated to permit the liquid level in the basin to be the same on both sides of the partition. Although the baffles are in this case shown to be disposed radially with respect to the tray, other arrangements may be used, and the most suitable positioning of the partitions may be found empirically. Operation is as was described for the first embodiment.

Figure 5:
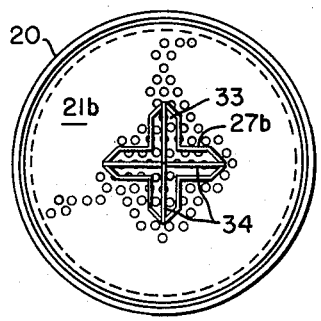
Figures 5 and 6 are plan views of trays showing two different embodiments of the claming device.
Figure 6:
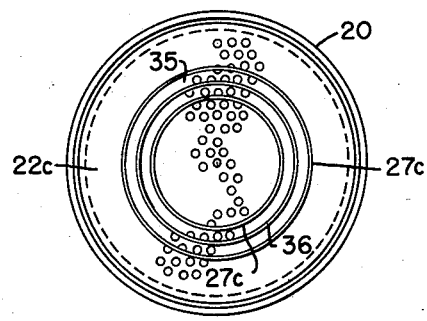

Figures 5 and 6 each shows a different special embodiment of a basin. In Figure 5 the basin 33 is cruciform, defined by a peripheral wall 27b of uniform height, and contains a pair of mutually perpendicular walls 34 extending above the peripheral wall to function as spray-catching baffles. The basin is mounted on a tray 21b, constructed as described above for the tray 21a. In Figure 6 the basin 35 is annular and is defined by two concentric peripheral walls 27c of equal heights and contains an intermediate cylindrical partition wall 36 extending to a greater height to serve as a spray-catching baffle. Both the surfaces of the baffles 34 and 36 serve to conduct liquid into the basins, which are mounted on a tray 22c like the tray 22a. The basins of Figures 5 and 6 may, if desired, be placed alternately on successive trays.

Figures 7, 8, 9:
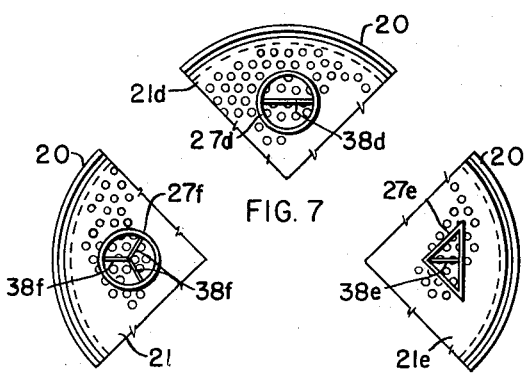
Figures 7, 8 and 9 are fragmentary plan views of trays showing three additional embodiments of the calming device.

Figures 7, 8 and 9 show three further possible shapes for the basins. In each instance the basin is defined by a peripheral wall 27d, 27e or 27f and contains an upstanding wall 38d, 38e or 38f to serve as a catching baffle, single baffles being provided in the case of the circular and triangular basins of Figures 7 and 8, and three walls radiating at angles of 120° being provided in the case of the circular basin of Figure 9. These basins are mounted on trays 21d, 21e or 21f, respectively, which are like the tray 21a.

An increase in the load on a tray having one or more calming devices and operating as described above results in a rise in the pressure drop through the tray. It may happen that the increased pressure drop following a load increase exceeds the hydrostatic head of the homogeneous liquid in the calming zone or zones which is responsible for the preferential flow of liquid through the openings in the bottom of the zones. The result of such excess pressure drop is then that gas enters through such openings and the basin is blown empty; the basin can thereafter again be restored to operative condition by a reduction in the load on the column sufficient to permit the basin to be refilled with homogeneous liquid.

This requirement, if for any reason objectionable, can be overcome or minimized by various expedients, among which are (1) providing an auxiliary liquid-collecting space, (2) a special design of the openings in the bottom of the basin, and (3) sinking the floor of the basin, or by a combination of these. The last of these, of course, no longer permits the catch basins to be formed as boxes without top and bottom walls and simply bolted or otherwise affixed to the upper face of the regular contacting tray while also the second expedient is usually applied by using a specially shaped tray. These expedients may be combined in various ways and will be described.

Figure 10:
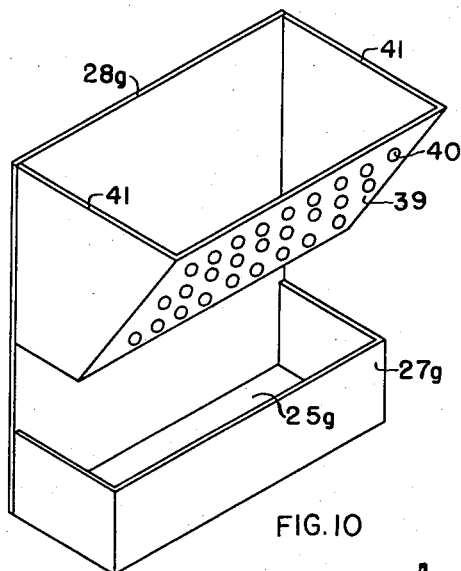
Figure 10 is an isometric view of another embodiment of a calming device and spray-catching baffle structure.

According to the first expedient, illustrated in Figure 10, an auxiliary liquid-collecting space is enclosed at least in part by one or more auxiliary baffles within which space liquid that splashes upwards is caught or deflected and fed into the basin that forms the calming zone, so that the rate of liquid influx to the basin is increased, as a result of which the liquid level in it is raised and the basin is prevented from being blown empty at a loading at which this would otherwise occur and/or is more rapidly refilled. In one preferred embodiment the baffle extends outwards from the horizontal projection of the top of the enclosing basin wall, being either inclined or curved, and must have openings for the passage of liquid. This is shown in Figure 10 as applied to a basin 25g which has an enclosing wall 27g and is constructed as described for Figures 1 and 2 (except that it is rectangular). The baffle 28g carries an inclined auxiliary baffle 39, the bottom of which is above the top of wall 27g and over an interior part of the basin and the top of which inclines upwards and outwards beyond the edge of the basin. This baffle has openings 40 and is joined to the baffle 28g by end walls 41, which may be perforated, if desired. An auxiliary liquid-collecting space is thus defined above the baffle 39, having a shape approximately that of an open rectangular funnel situated at some distance above the top of the enclosing wall 27g. This space forms a quiescent zone which is filled with gas, mist and liquid. Some of the descending spray enters this space from the top while a part of the ascending spray striking the outer side of the baffle 39 is forced through the openings 40 into the auxiliary space. This liquid flows into the basin 25g either along the auxiliary baffle 39 or along the walls 28g or 41. While the auxiliary perforated baffle was described with reference to a basin of the type shown for Figures 1 and 2, it will be obvious that such a baffle can also be provided for the other embodiments shown, and that the auxiliary space can be defined by baffles of other shapes, e. g., in the form of a surface of revolution.

According to the second expedient for overcoming the consequences of blowing empty or "missing," the restricted openings in the bottom of the basin are given a different shape and/or size from those over the remaining part of the tray so that the resistance to upward gas flow is greater in the basin than elsewhere. When the load is increased, as soon as the ascending vapors tend to blow the liquid out of the basin, the relatively higher resistance in the restricted openings at the bottom of the basin counteracts this tendency of the vapor to flow via the basin. In order to utilize this principle of differential gas flow resistance a grid, sieve plate, or slit plate in the column may be provided, for example, with openings which are rounded off on the required inlet side. In openings inside the basin this rounding off is consequently on the top surface of the tray, and on the bottom surface in openings outside of the basin.

Figure 11:
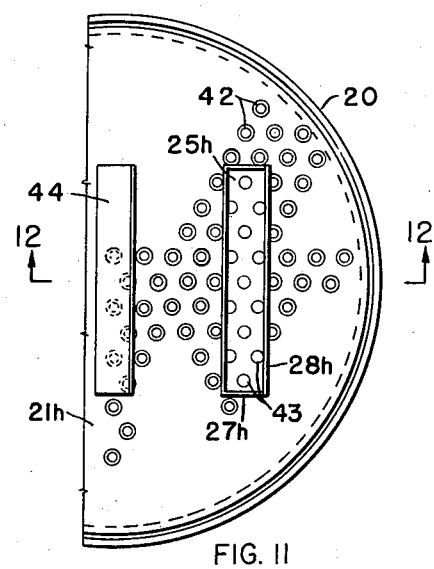
Figure 11 is a fragmentary plan view of a sieve plate tray, modified to receive the calming device of the invention.
Figure 12:
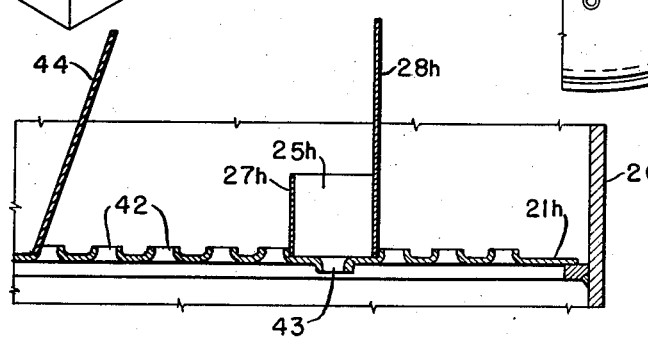
Figure 12 is an enlarged fragmentary sectional view taken on the line 12—12 of Figure 11.

The second expedient is illustrated in Figures 11 and 12 as applied to a punched sieve plate. The tray 21h, which may be of sheet metal, has punched holes 42 and 43, which may have uniform sizes, except that the holes 43, which are situated at the bottom of the basin 25h that constitutes the calming zone, may provide a different, e. g., a greater or smaller open area in relation to the tray area, than the other openings. The calming device includes an enclosing wall 27h a part 28h of which extends upwards to form a spray-catching baffle. The holes 42, outside the wall 27h, have lips extending upwards to provide rounding off of the edges only at the bottom, where the gas enters; the holes 43 have lips extending downwards to provide rounding off of the edges only at the top, where liquid enters.

Figures 11 and 12 further illustrate a variant of the first expedient, including a baffle 44, mounted outside of and inclined toward the wall 27h to deflect the liquid splashed upward, or the dispersed liquid, in the direction of the basin. The top of this baffle may be curved upwards and toward the basin.

Figure 13:
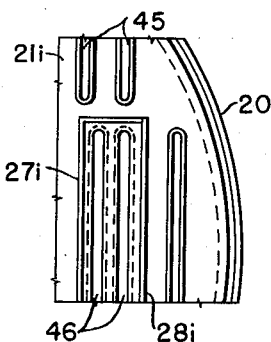
Figure 13 is a fragmentary plan view of a slit plate tray, modified to receive the calming device.

Figure 13 shows the application of the invention to a slit-plate tray 21i. The tray, which may be made of sheet metal, has punched slits 45 and 46, which may have uniform widths and spacings to provide passages as previously described for the grid tray, except that the slits 46 under the calming zone may provide a different open area, e. g., a greater or smaller open area, in relation to the area of the calming zone. The calming device includes a basin formed by the enclosing wall 27i and a spray-catching baffle 28i as described for the baffle 28h in Figures 11 and 12. If desired, the slits 45 may have downwardly extending lips and the slits 46 upwardly extending lips, as indicated in Figure 13 and previously described for the holes 42 and 43, respectively.

The holes 42 and 43 and the slits 45 and 46 may be shaped by punching against suitable dies.

According to the third expedient for overcoming the phenomenon of blowing empty, the floor of the basin is sunk beneath the general level of the tray. Since a taller column of homogeneous liquid is thereby accumulated beneath the rim of the enclosing wall 27, 27a, etc., its pressure will be better able to resist the gas pressure under the tray than will the bed of liquid on the remainder of the tray. Although an increased head can also be achieved by simply raising the height of the enclosing wall, this cannot be done beyond a certain limit without impairing the entrance of liquid, as previously noted.

Figure 14:
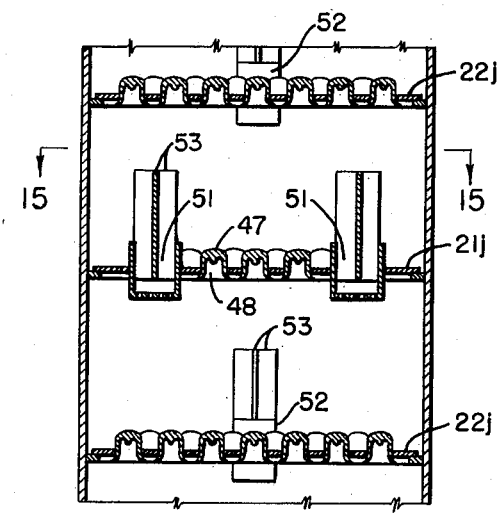
Figure 14 is a vertical sectional view of a part of a bubble cap tray contacting column to which another modified embodiment of the invention is applied.
Figure 15:
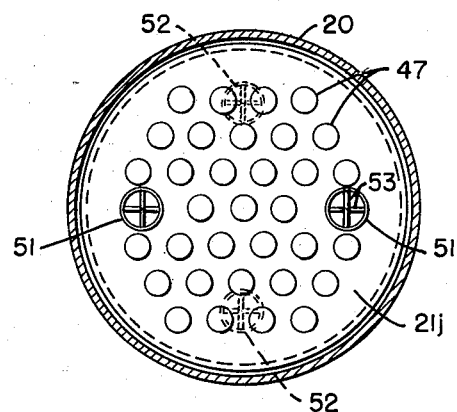
Figure 15 is a transverse sectional view, taken on the line 15—15 of Figure 14.
Figure 16:
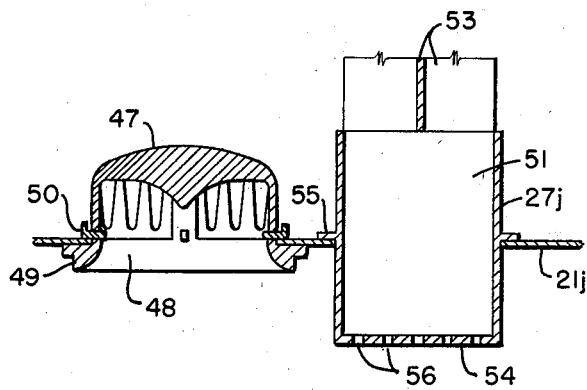
Figure 16 is an enlarged detail view of a portion of Figure 14.

The third expedient is illustrated in Figures 14–16 as applied to a column 20 provided with bubble cap trays 21j and 22j, that extend fully across the column cross sectional area and have openings over which are fitted bubble caps 47. Although the invention is not restricted thereto, it is advantageous to employ in this embodiment bubble caps that are not provided with risers, but which have free, direct lateral communications at the tray level between the liquid on the tray and the top of the vapor passage 48. This passage is preferably streamlined to have the bottom edge thereof rounded by providing an integral entrance ring 49 at the bottom, to reduce the pressure drop. These caps may be secured by thin, vertically elongated wedges 50. Apart from the advantages of lower pressure drop and a more efficient utilization of the available tray area, such bubble caps permit the liquid to drain freely from tray to tray when the column is shut down. When the column is in operation the gas velocity is sufficient to prevent liquid from flowing down through the passages 48. Each tray has a plurality, e. g. two, calming devices providing basins 51 or 52, situated at diametrically opposed locations on the tray; the basins 51 and 52 are located in staggered relation to each other on alternate trays. Each basin has a peripheral wall 27j, a pair of mutually perpendicular catching baffles 53 extending upwards to a greater height, and a floor 54, situated beneath the tray level but near to it. The basin is mounted by lateral support flanges 55. Restricted perforations 56 are formed in the floor.

It is evident that, for a given height of the wall 27j above the tray level, the liquid column in the basins 51 and 52 can attain a greater head than in the case of the embodiments previously described.

It has been found from tests with a particular sieve plate eighteen inches in diameter having calming devices as shown in Figures 1 and 2, that, for total reflux distillation, in a system providing a gas density of approximately 0.2 lbs. per cubic foot, when the load is increased by increasing the boiling rate at the bottom of the column, blowing empty occurred at a gas velocity through the tray openings of 5.7 feet per second. The homogeneous liquid column could be re-established and normal operation could be resumed when the gas velocity was reduced to 4.6 ft. per sec.

By providing an auxiliary collecting space above and laterally beyond the calming zone, as shown in Figure 10, the load could be increased to a gas velocity of 7.0 ft. per sec. in this device before flowing empty occurred, and the calming device resumed normal operation when the gas velocity was reduced to 6.3–6.5 ft. per sec.

By providing a calming device with a sunken bottom, as shown in Figures 14–16, to the same sieve tray, no blowing empty occurred even at gas velocities as high as 7.2 ft. per sec., so that when the load was afterwards gradually reduced the liquid continued to be discharged from the tray preferentially via the sunken basin without any spasmodic interruption.

The hysteresis phenomenon, whereby a reduction in loading is necessary to resume normal operation after the calming zone is blown empty is, therefore, largely overcome by these expedients. It may be noted that this phenomenon becomes less pronounced in trays of larger diameters.

By way of a specific example, a sieve tray having a diameter of eighteen inches was constructed having round holes 10 mm. in diameter, spaced uniformly to provide a free passage of 20% of the tray area, and on it was mounted a calming device including a basin having the shape shown in Figures 1 and 2; the dimensions of the basin were 5.5 x 22 cm., the wall height of the walls 27 and 28 were 8 cm. and 30 cm., respectively, above the top of the tray. Mixtures of heptane and toluene, on the one hand, and benzene and toluene, on the other, were distilled under total reflux. Over a considerable part of the loading range, including all of the upper half thereof, tray efficiencies were from 79 to 87% for the former mixture and from 69 to 78% for the latter. Capacities were about 40% greater than in comparative runs performed with the same tray and mixtures but without the calming device.

We claim as our invention:

1. A contacting tray for gas-liquid contacting columns comprising a tray structure adapted to extend horizontally across the column to accumulate liquid and having a plurality of passages extending through the tray structure for the upflow of gas to engage accumulated liquid and throw up a spray, said tray being of the type wherein all liquid transfer between trays is by free fall through the inter-tray space; a calming device situated near the tray level including a confining wall which extends upwards to a height above the tray level and encloses a restricted basin for the collection and retention of becalmed liquid in lateral isolation from liquid on adjoining tray regions, said basin extending over only a minor portion of the tray area, being open at the top and closed at the bottom but having at the bottom one or more restricted passageways which communicate directly with the space beneath the tray for the discharge of liquid, said passageways having an aggregate area less than the area of the basin so as to retain within the basin a body of substantially homogeneous liquid in amount to produce a hydrostatic head which exceeds that of the liquid on adjoining tray regions but large enough to permit the upflow of gas therethrough at low loading.

2. A contacting tray according to claim 1 wherein said basin has a width between one-half and four inches.

3. In combination with the contacting tray according to claim 1, a spray-catching device situated at least in part higher than the top of said confining wall for catching a part of said spray and feeding liquid into said basin.

4. In combination with the tray according to claim 1, an upright baffle on the tray situated outside of said confining walls disposed to direct a portion of said spray into the said restricted basin.

5. A contacting tray for gas-liquid contacting columns comprising a tray structure adapted to extend horizontally across the column to accumulate liquid and having a plurality of passages extending through the tray structure for the upflow of gas to engage accumulated liquid and throw up a spray, said tray being of the type wherein all liquid transfer between trays is by free fall through the inter-tray space; a calming device situated near the tray level including a confining wall which extends upwards to a height above the tray level and encloses a restricted basin for the collection and retention of becalmed liquid in lateral isolation from liquid on the adjoining tray regions, said basin extending over only a minor portion of the tray area, being open at the top and closed at the bottom but having at the bottom one or more restricted passageways which communicate directly with the space beneath the tray for the discharge of liquid, said passageways having an aggregate area less than the area of the basin so as to retain within the basin a body of substantially homogeneous liquid in amount to produce a hydrostatic head which exceeds that of the liquid on adjoining tray regions but large enough to permit the upflow of gas therethrough at low loading; and a spray-catching device situated at least partly above said basin for engaging and coalescing a part of said spray and directing the coalesced liquid downwards into the basin.

6. A contacting tray according to claim 5 wherein said passageways at the bottom are rounded on their upper, inlet ends only to counteract the tendency of gas to flow upwards into the calming zone.

7. A contacting device according to claim 5 wherein the bottom of the calming device is a part of the tray structure, situated at the same level as the remaining parts of the tray.

8. A contacting tray according to claim 5 wherein the bottom of the calming device is situated below the said tray level.

9. A contacting device according to claim 5 wherein the top of said tray structure is substantially flat throughout the area thereof and the tray structure has the said passages distributed over said area, including the area of said calming zone, and said calming device is mounted on the top of the tray.

10. A contacting tray according to claim 5 wherein said spray-catching device includes an inclined baffle having perforations, the upper part of said baffle being situated outside the horizontal projection of the top of said confining wall and the bottom of the baffle being situated within said horizontal projection.

References Cited in the file of this patent

UNITED STATES PATENTS

| | | |
|---|---|---|
| 1,621,728 | Jordan | Mar. 22, 1927 |
| 1,643,696 | Campbell | Sept. 27, 1927 |
| 1,987,630 | Myers | Jan. 15, 1935 |
| 2,682,394 | Guthrie et al. | June 29, 1954 |
| 2,767,966 | Chave | Oct. 23, 1956 |
| 2,767,967 | Hutchinson | Oct. 23, 1956 |

FOREIGN PATENTS

| | | |
|---|---|---|
| 509,927 | Germany | Oct. 14, 1930 |
| 633,433 | Germany | July 27, 1936 |
| 663,349 | Germany | Aug. 4, 1938 |
| 737,315 | France | Oct. 3, 1932 |